(12) United States Patent
Sato et al.

(10) Patent No.: US 7,604,105 B2
(45) Date of Patent: Oct. 20, 2009

(54) ROTATION TRANSMISSION DEVICE

(75) Inventors: Koji Sato, Iwata (JP); Yoshihiro Demura, Iwata (JP)

(73) Assignee: NTN Corporation, Osaka (JP)

( * ) Notice: Subject to any disclaimer, the term of this patent is extended or adjusted under 35 U.S.C. 154(b) by 305 days.

(21) Appl. No.: 11/348,463

(22) Filed: Feb. 7, 2006

(65) Prior Publication Data
US 2006/0180424 A1  Aug. 17, 2006

(30) Foreign Application Priority Data

| Feb. 16, 2005 | (JP) | ............................. 2005-039006 |
| Feb. 16, 2005 | (JP) | ............................. 2005-039016 |
| Feb. 16, 2005 | (JP) | ............................. 2005-039385 |

(51) Int. Cl.
*F16D 27/102* (2006.01)
*F16D 27/14* (2006.01)

(52) U.S. Cl. ..................... 192/35; 192/30 V; 192/40; 192/84.8

(58) Field of Classification Search ............... 192/35, 192/38, 40, 84.8, 30 V, 84.96, 84.961
See application file for complete search history.

(56) References Cited

U.S. PATENT DOCUMENTS

| 4,301,906 | A | * | 11/1981 | Shirai ..................... 192/84.961 |
| 6,282,053 | B1 | * | 8/2001 | MacLeod et al. ......... 360/98.07 |
| 6,766,888 | B2 | * | 7/2004 | Yasui et al. .................... 192/35 |
| 7,086,513 | B2 | * | 8/2006 | Bunko .......................... 192/35 |
| 2003/0051961 | A1 | * | 3/2003 | Yasui et al. .................... 192/35 |

FOREIGN PATENT DOCUMENTS

JP    2003-191769    7/2003

\* cited by examiner

*Primary Examiner*—Rodney H Bonck
(74) *Attorney, Agent, or Firm*—Wenderoth, Lind & Ponack L.L.P.

(57) ABSTRACT

A rotation transmission device includes inner and outer rings and a two-way clutch therebetween. An electromagnetic clutch is provided to selectively engage and disengage the two-way clutch, and includes an electromagnet having a core to which a flange is secured. The flange is received in a recess formed in a stationary member. A snap ring is engaged in a groove formed in the recess to prevent the flange from coming out of the recess. An elastic member is disposed between the flange and the end wall of the recess. The elastic member presses the flange against the snap ring, thereby axially positioning the electromagnet. The elastic member is free of load resulting from magnetic attraction of the electromagnet when energized. This makes it possible to reduce the spring force of the elastic member and thus its diameter and cost.

8 Claims, 4 Drawing Sheets

ROTATION TRANSMISSION DEVICE

BACKGROUND OF THE INVENTION

This invention relates to a rotation transmission device mounted in the powertrain of a vehicle to selectively transmit torque between input and output members.

JP patent publication 2003-191769A discloses a rotation transmission device mounted on a four-wheel drive vehicle based on the front-engine, rear-wheel drive layout to selectively transmit torque to the front wheels as auxiliary drive wheels.

The rotation transmission device disclosed in this publication includes an outer ring coupled to a propeller shaft of the vehicle, and an inner ring coupled to a pinion shaft of a differential of the vehicle. A two-way clutch is mounted between the inner and outer rings. An electromagnetic clutch is provided in juxtaposition with the two-way clutch to selectively engage and disengage the two-way clutch. When the two-way clutch engages, the inner and outer rings are rotationally coupled together, so that torque is transmitted from the outer ring to the inner ring.

The two-way clutch comprises a cylindrical surface formed on the inner periphery of the outer ring, a plurality of cam faces formed on the outer periphery of the inner ring so as to radially oppose the cylindrical surface of the outer ring, rollers each received in one of wedge-shaped spaces defined between the cylindrical surface and the cam faces and having narrow circumferential ends, and a retainer retaining the rollers in position. When the retainer rotates relative to the inner ring, the rollers are moved by the retainer into engagement with the cylindrical surface and the cam faces. A switch spring is mounted between the inner ring and the retainer to bias the retainer toward its neutral position where the rollers are not in engagement with the cylindrical surface and the cam faces.

The electromagnetic clutch comprises an armature rotationally fixed but axially movable relative to the retainer, a rotor rotationally fixed to the outer ring and axially facing the retainer with the armature disposed therebetween, and an electromagnet axially facing the armature with the rotor disposed therebetween. By energizing the electromagnetic coil of the electromagnet, the armature is magnetically attracted toward the electromagnet until pressed against the rotor. Thus, the retainer, which is rotationally fixed to the armature, rotates together with the outer ring and thus rotates relative to the inner ring. The rollers are thus moved by the retainer into engagement with the cylindrical surface and the cam faces.

The electromagnet is mounted to a stationary member or housing. But depending upon machining accuracy of the parts forming the electromagnet, the electromagnet may be supported unstably on the housing such that the electromagnet is axially movable. This may make it difficult to rotate the retainer relative to the inner ring against the force of the switch spring until the rollers fully engage the cylindrical surface and the cam faces, thus destabilizing the operation of the two-way clutch.

Also, if the electromagnet is unstably mounted, it tends to vibrate when the vehicle vibrates, thus producing noise.

In order to stably mount the electromagnet, JP patent publication 2003-191769A proposes to secure a flange to a core supporting the electromagnetic coil of the electromagnet. The flange is received in a recess formed in the stationary member. A snap ring is engaged in a groove formed in the inner periphery of the recess. An elastic member is disposed between the snap ring and the flange to press the flange against the end wall of the recess.

In this arrangement, because the elastic member is disposed between the flange and the snap ring, in order to axially position the electromagnet by pressing the electromagnet against the end wall of the recess, the elastic member has to have a spring force greater than the sum of the product F1 of the axial vibration G and the weight W of the electromagnet and the load F2 applied to the elastic member when the electromagnet is pulled toward the rotor under the magnetic attraction produced when the electromagnet is energized. Thus, the elastic member has to have a sufficiently large spring force.

Because the elastic member has a large spring force, it is necessary to compress the elastic member with a large force to mount the snap ring in the groove. It is thus troublesome and time-consuming to mount the snap ring. Also, as the elastic member, one having a diameter larger than the outer diameter of the core has to be used. Such an elastic member is naturally costly.

Such conventional rotation transmission devices comprise a large number of parts because they need the flange secured to the core, the snap ring and the elastic member disposed between the flange and the snap ring in order to axially position the electromagnet. Further, since the flange is a separate member from the core and has to be secured to the core by welding or caulking a rivet, the cost for fixing the flange to the core is high.

A first object of the present invention is to provide a rotation transmission device in which the electromagnet of the electromagnetic clutch can be axially positioned using an elastic member that is smaller in spring force and thus less costly than those used in conventional rotation transmission devices, whereby the snap ring can be mounted more easily.

A second object of the invention is to provide a rotation transmission device in which the electromagnet of the electromagnetic clutch can be axially positioned with a simpler and less costly positioning structure.

SUMMARY OF THE INVENTION

According to the present invention, there is provided a rotation transmission device comprising an outer ring, an inner ring mounted inside the outer ring, a two-way clutch for selectively coupling and uncoupling the inner and outer rings, an electromagnetic clutch provided in juxtaposition with the two-way clutch for selectively engaging and disengaging the two-way clutch, the electromagnetic clutch including an electromagnet having a core, a stationary member formed with a recess having an end wall, and a positioning structure for axially positioning the electromagnet, the positioning structure comprising a flange fixed to the core of the electromagnet and received in the recess of the stationary member, a snap ring engaged in a groove formed in an inner periphery of the recess, the snap ring engaging the flange to prevent the flange from coming out of the recess, and an elastic member disposed between the end wall of the recess and the flange, thereby pressing the flange against the snap ring.

With this arrangement, the electromagnet can be accurately mounted so as not to move axially.

While the electromagnetic clutch is on, the electromagnet is pressed against the rotor under the magnetic attraction produced by the electromagnet. But since the elastic member is disposed between the flange and the end wall of the recess, the elastic member is completely free of any load resulting from such magnetic attraction. Thus, the elastic member is only required to have a spring force sufficient to overcome the axial vibration G of the electromagnet. Thus, the spring force of the elastic member can be set at a smaller value than conventional elastic members, so that the snap ring can be mounted more easily. Such an elastic member is naturally smaller in diameter and less expensive.

From another aspect of the present invention, there is provided a rotation transmission device comprising an outer ring, an inner ring mounted inside the outer ring, a two-way clutch for selectively coupling and uncoupling the inner and outer rings, an electromagnetic clutch provided in juxtaposition with the two-way clutch for selectively engaging and disengaging the two-way clutch, the electromagnetic clutch including an electromagnet having a core, a stationary member formed with a recess having an end wall, the core of the electromagnet having one end thereof received in the recess of the stationary member, and a positioning structure for axially positioning the electromagnet, the positioning structure comprising a snap ring engaged in a first groove formed in an inner periphery of the recess, a disc spring having a radially inner portion thereof engaged in a second groove formed in an outer periphery of the core at its portion axially offset from the first groove toward the end wall of the recess, the disc spring having a radially outer portion thereof pressed against the snap ring, whereby the core is pressed against the end wall of the recess under a reaction force applied to the core from the snap ring through the disc spring.

With this arrangement, the disc spring has, besides the function of pressing the core against the end wall of the recess, an additional function of axially positioning the core. Thus, the electromagnet can be supported so as to be axially immovable with the simple positioning structure, which comprises a small number of parts and thus is less costly.

From still another aspect of the present invention, there is provided a rotation transmission device comprising an outer ring, an inner ring mounted inside the outer ring, a two-way clutch for selectively coupling and uncoupling the inner and outer rings, an electromagnetic clutch provided in juxtaposition with the two-way clutch for selectively engaging and disengaging the two-way clutch, the electromagnetic clutch including an electromagnet having a core, a stationary member formed with a recess having an end wall and an opening, the core of the electromagnet having one end portion thereof received in the recess of the stationary member, and a positioning structure for axially positioning the electromagnet, the positioning structure comprising a first snap ring engaged in a groove formed in an outer periphery of the one end portion of the core, a second snap ring engaged in a groove formed in an inner periphery of the recess at its portion axially offset from the first snap ring toward the opening of the recess, and an elastic member disposed between the first and second snap rings for pressing the core against the end wall of the recess, thereby axially positioning the core.

With this arrangement, it is possible to eliminate the need for the conventional flange. It is thus not necessary to fix the flange to the core of the electromagnet by fixing means such as welding. The electromagnet can therefore be fixed in position at a low cost.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
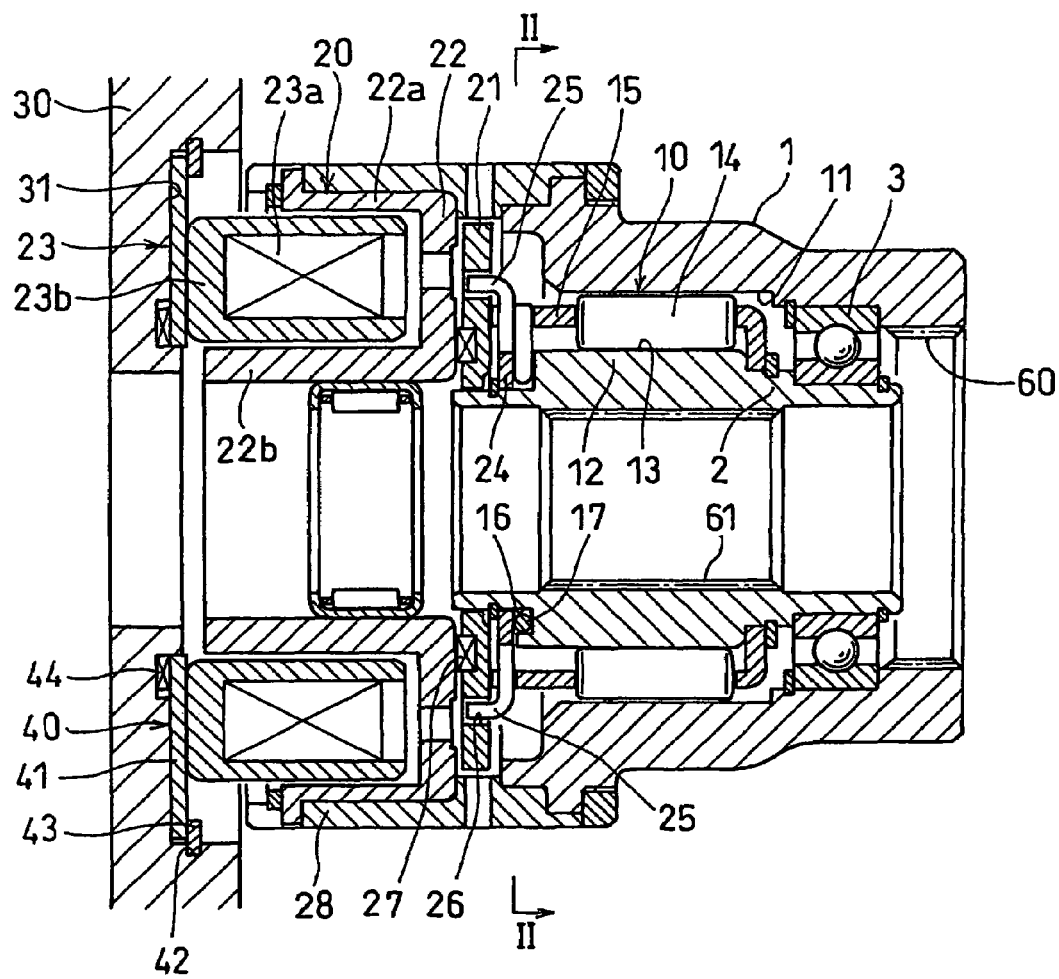
FIG. 1 is a front view in vertical section of a rotation transmission device embodying the present invention.

The embodiment is now described with reference to the drawings. As shown in FIG. 1, the rotation transmission device of the embodiment includes an outer ring 1 and an inner ring 2 rotatably mounted in the outer ring 1 through a bearing 3.

A two-way clutch 10 is disposed between the inner and outer rings 2 and 1. The two-way clutch 10 comprises a cylindrical surface 11 formed on the inner periphery of the outer ring 1, a plurality of cam faces 13 formed on the outer periphery of a large-diameter portion 12 of the inner ring 2 so as to radially oppose the cylindrical surface 11 of the outer ring 1, rollers 14 each received in one of wedge-shaped spaces defined between the cylindrical surface 11 and the cam faces 13 and having narrow circumferential ends, and a retainer 15 retaining the rollers 14 in position.

Figure 2:
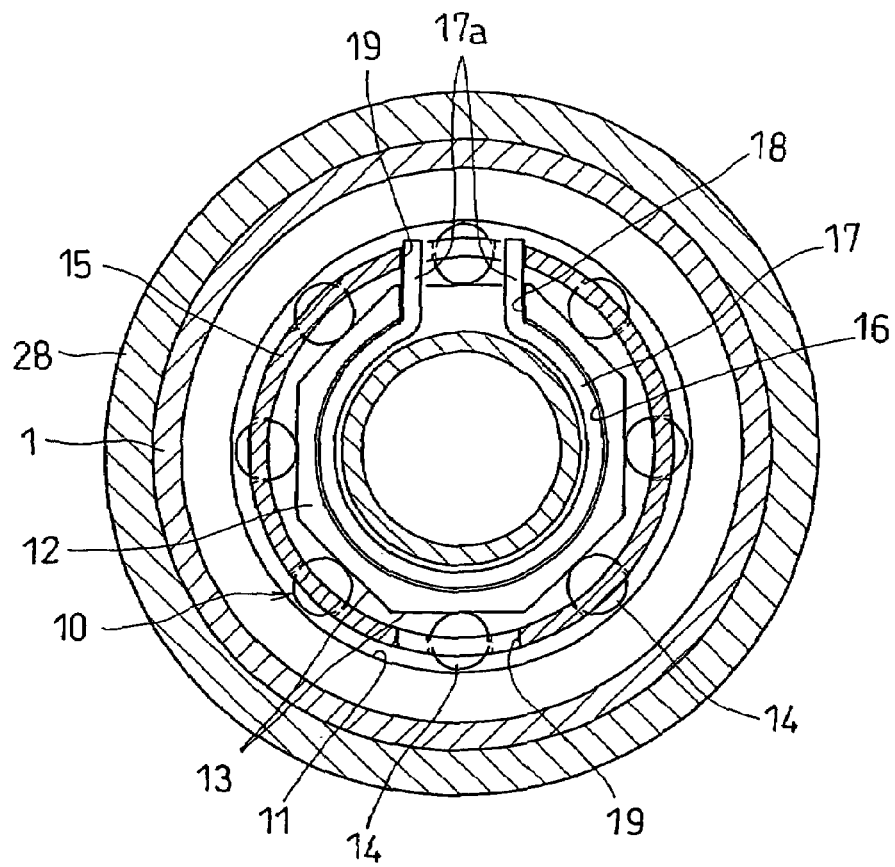
FIG. 2 is a sectional view taken along line II-II of FIG. 1.

As shown in FIG. 2, a switch spring 17 is received in a recess 16 formed in an end face of the large-diameter portion 12 of the inner ring 2. The switch spring 17 is a substantially C-shaped member having radially outwardly bent portions 17a at both ends thereof.

The bent portions 17a are inserted through a cutout 18 formed in the wall of the large-diameter portion 12 defining the recess 16 into one of two diametrically opposed cutouts 19 formed in the retainer 15 at one end thereof. The bent portions 17a thus press the circumferentially opposed side walls of the cutout 18 and the circumferentially opposed side walls of the one of the cutouts 19 circumferentially away from each other, thereby biasing the retainer 15 toward its neutral position where the rollers 14 are not in engagement with the cylindrical surface 11 and the cam faces 13.

As shown in FIG. 1, the rotation transmission device further includes an electromagnetic clutch 20 disposed in juxtaposition with the two-way clutch 10 to selectively engage and disengage the two-way clutch 10.

The electromagnetic clutch 20 includes an armature 21 axially facing an end face of the retainer 15, a rotor 22 axially facing the end face of the retainer 15 with the armature 21 disposed therebetween, and an electromagnet 23 axially facing the armature 21 with the rotor 22 disposed therebetween.

A coupling plate 24 is fitted in the end face of the retainer 15. The coupling plate 24 has a pair of diametrically opposite, radial extensions 25 each extending through one of the cutouts 19 formed in the retainer 15, thus keeping the coupling plate 24 nonrotatable relative to the retainer 15. Each extension 25 has its radially outer end axially bent away from the retainer 15 and engaged in a hole 26 formed in the armature 21. Thus, the armature 21 is supported by the retainer 15 through the coupling plate 24 so as to be rotationally fixed but axially movable relative to the retainer 15.

Between the armature 21 and the rotor 22, a compression spring 27 is disposed to bias the armature 21 axially away from the rotor 22.

The rotor 22 is made of a magnetic material. The rotor 22 comprises an annular portion axially facing the armature 21, and radially inner and outer cylindrical portions 22b and 22a extending axially away from the armature 21 from the radially inner and outer edges of the annular portion, respectively. The radially outer cylindrical portion 22a is pressed into a rotor guide 28 made of a nonmagnetic material and connected to an open end of the outer ring 1, and the radially inner cylindrical portion 22b is rotatably supported by a bearing. The rotor 22 is thus rotatable together with the outer ring 1.

The electromagnet 23 is disposed between the inner and outer cylindrical portions 22b and 22a of the rotor 22. The electromagnet 23 comprises an electromagnetic coil 23a and a core 23b having a substantially U-shaped section and supporting the electromagnetic coil 23a. The core 23b has its open end facing the annular portion of the rotor 22 and its closed end received in a recess 31 formed in a stationary member 30. The core 23b is axially immovably held in position by a positioning structure 40.

Figure 3:
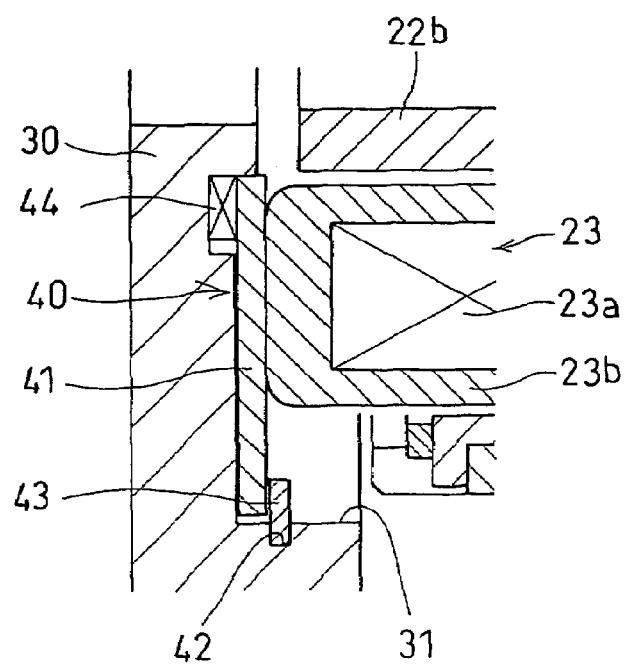
FIG. 3 is an enlarged partial sectional view of the rotation transmission device of FIG. 1, showing its electromagnet and its positioning structure.

As shown in FIG. 3, the positioning structure 40 comprises a flange 41 secured to the closed end of the core 23b and received in the recess 31, a snap ring 43 engaged in a groove 42 formed in the inner periphery of the recess 31 to prevent separation of the flange 41, and an elastic member 44 disposed between the flange 41 and the end wall of the recess 31 to press the flange 41 against the snap ring 43. The elastic member 44 may be a disc spring or a wave spring.

An input shaft (not shown) is connected to the outer ring 1 through splines 60 formed on the inner periphery of the outer ring 1. An output shaft (not shown) is connected to the inner ring 2 through splines 61 formed on the inner periphery of the inner ring 2.

FIGS. 1 and 2 show a state of the rotation transmission device while the electromagnetic coil 23a of the electromagnet 23 is not energized. In this state, the rollers 14 of the two-way clutch 10 are at their neutral position where the rollers 14 are not in engagement with the cylindrical surface 11 and cam faces 13.

Thus, when the outer ring 1 rotates in this state, its rotation is not transmitted to the inner ring 2.

When the electromagnetic coil 23a of the electromagnet 23 is energized with the outer ring 1 rotating, the armature 21 is pulled toward the electromagnet 23 until pressed against the rotor 22. The armature 21 is thus coupled to the outer ring 1. Since the armature 21 is rotationally fixed to the retainer 15, the retainer 15 begins to rotate together with the outer ring 1. That is, the retainer 15 rotates relative to the inner ring 2, thus moving the rollers 14 into engagement with cylindrical surface 11 and the cam faces 13. The rotation of the outer ring 1 is thus transmitted to the inner ring 2 through the rollers 14.

When the retainer 15 rotates relative to the inner ring 2, the switch spring 17 is elastically deformed. Thus, when the electromagnetic coil 23a of the electromagnet 23 is deenergized, under the restoring force of the switch spring 17, the retainer 15 is turned back to its original position, while moving the rollers 14 to their neutral position where the rollers 14 disengage from the cylindrical surface 11 and the cam faces 13. Rotation of the outer ring 1 is now not transmitted to the inner ring 2.

In this arrangement, if the electromagnet 23 is not axially positioned in a stable manner, it is difficult to elastically deform the switch spring 17 such that the two-way clutch 10 is stably and reliably engageable and disengageable when the electromagnetic coil 23a is energized and deenergized. Also, the electromagnet 23 tends to axially vibrate, producing noise.

In the embodiment, the flange 41 secured to the core 23b is received in the recess 31 formed in the stationary member 30, the snap ring 43 is engaged in the groove 42 formed in the inner periphery of the recess 31 to prevent separation of the flange 41, and the elastic member 44 is disposed between the flange 41 and the end wall of the recess 31 to press the flange 41 against the snap ring 43, thereby preventing axial vibration of the electromagnet 23.

While the electromagnetic clutch 20 is on, the electromagnet 23 is pressed against the rotor 22 under the magnetic attraction produced by the electromagnet 23. But since the elastic member 44 is disposed between the flange 41 and the end wall of the recess 31, the elastic member 44 is completely free of any load resulting from such magnetic attraction. Thus, the elastic member 44 is only required to have a spring force sufficient to overcome the axial vibration G of the electromagnet 23.

Thus, the spring force of the elastic member 44 can be set at a smaller value than conventional elastic members, so that the snap ring 43 can be mounted more easily. Such an elastic member 44 is naturally smaller in diameter and less expensive.

The two-way clutch 10 of the embodiment comprises engaging elements in the form of rollers, but the two-way clutch according to the present invention is not limited to the roller type. For example, its engaging elements may comprise sprags. If the two-way clutch 10 is of the sprag type, the inner and outer rings are formed with radially opposed cylindrical surfaces on their outer and inner periphery, respectively, and the sprags are mounted in the space defined between the radially opposed inner and outer cylindrical surfaces. The sprags are retained by a small-diameter retainer fixed to the inner ring and a large-diameter retainer coupled to the inner ring through a switch spring which biases the retainer to its neutral position where the sprags are disengaged from the cylindrical surfaces. The large-diameter retainer is brought into and out of engagement with the outer ring by selectively activating and deactivating the electromagnetic clutch.

Figure 4:
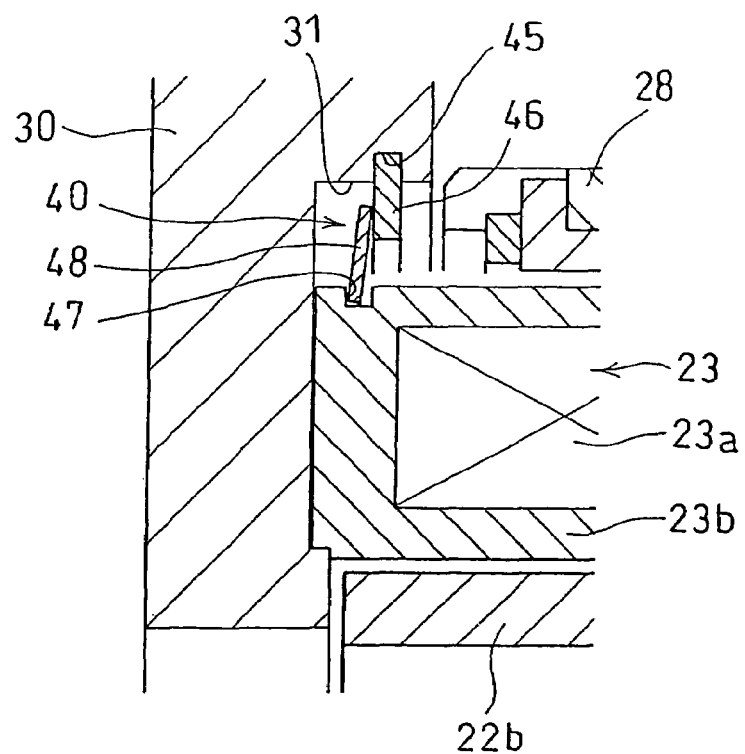
FIG. 4 is a sectional view of a different positioning structure for the electromagnet.

FIG. 4 shows a different positioning structure 40 according to the present invention. This positioning structure 40 comprises a snap ring 46 engaged in a groove 45 formed in the inner periphery of the recess 31, and disc spring 48 having its radially inner edge received in a groove 47 formed in the outer periphery of the core 23b at a position axially offset from the snap ring 46 toward the end wall of the recess 31 and having its radially outer edge pressed against the snap ring 46. Thus, the core 23b is pressed against the end wall of the recess 31 by the reaction force applied to the disc spring 48 from snap ring 46.

Figure 5A:
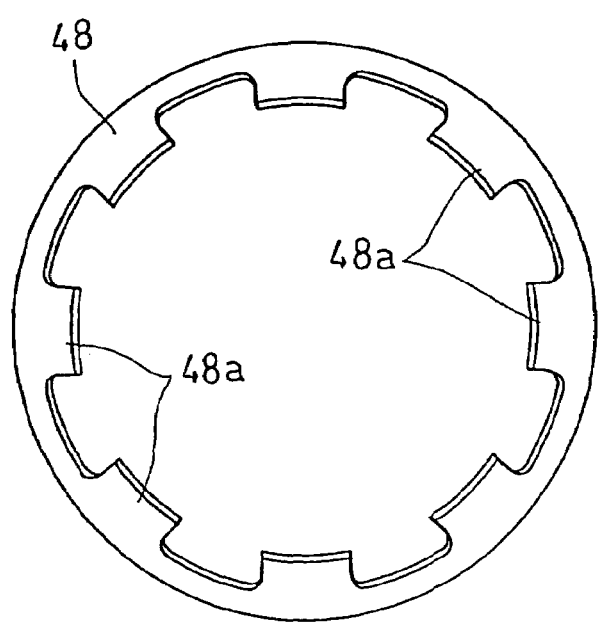
FIGS. 5A and 5B are a front view and a vertical sectional side view of the disc spring used in the positioning structure of FIG. 4.
Figure 5B:
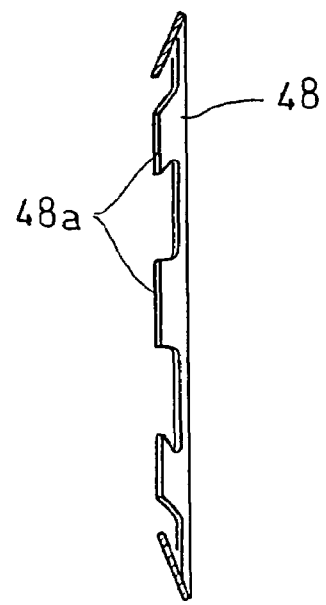

The disc spring 48 may have its radially outer edge cut apart, or may be one as shown in FIGS. 5A and 5B.

The disc spring 48 shown in FIGS. 5A and 5B includes elastically deformable portions 48a protruding radially inwardly from its radially inner edge. In order to mount this disc spring 48 on the core 23b as shown in FIG. 4, the disc spring 48 is pressed onto the core 23b from its rear closed end so that the elastically deformable portions 48a are elastically deformed and slid axially toward its front end until the elastically deformable portions 48a spring back and engage in the groove 47 formed in the outer periphery of the core 23b. Thus, the disc spring 48 can be easily mounted on the core 23b.

With the disc spring 48 engaged in the groove 47, the disc spring 48 presses the snap ring 46. Thus, the core 23b is pressed against the end wall of the recess 31 by the reaction force applied to the disc spring 48 from the snap ring 46. This prevents axial movement of the electromagnet 23 due e.g. to vibrations of the vehicle body. The electromagnet 23 can thus be mounted in position in an extremely stable manner.

Besides the function of pressing the core 23b against the end wall of the recess 31, the disc spring 48 has an additional function of axially positioning the core 23b. Thus, the electromagnet 23 can be supported so as to be axially immovable with the simple positioning structure 40, which comprises a small number of parts and thus is less costly.

Figure 6:
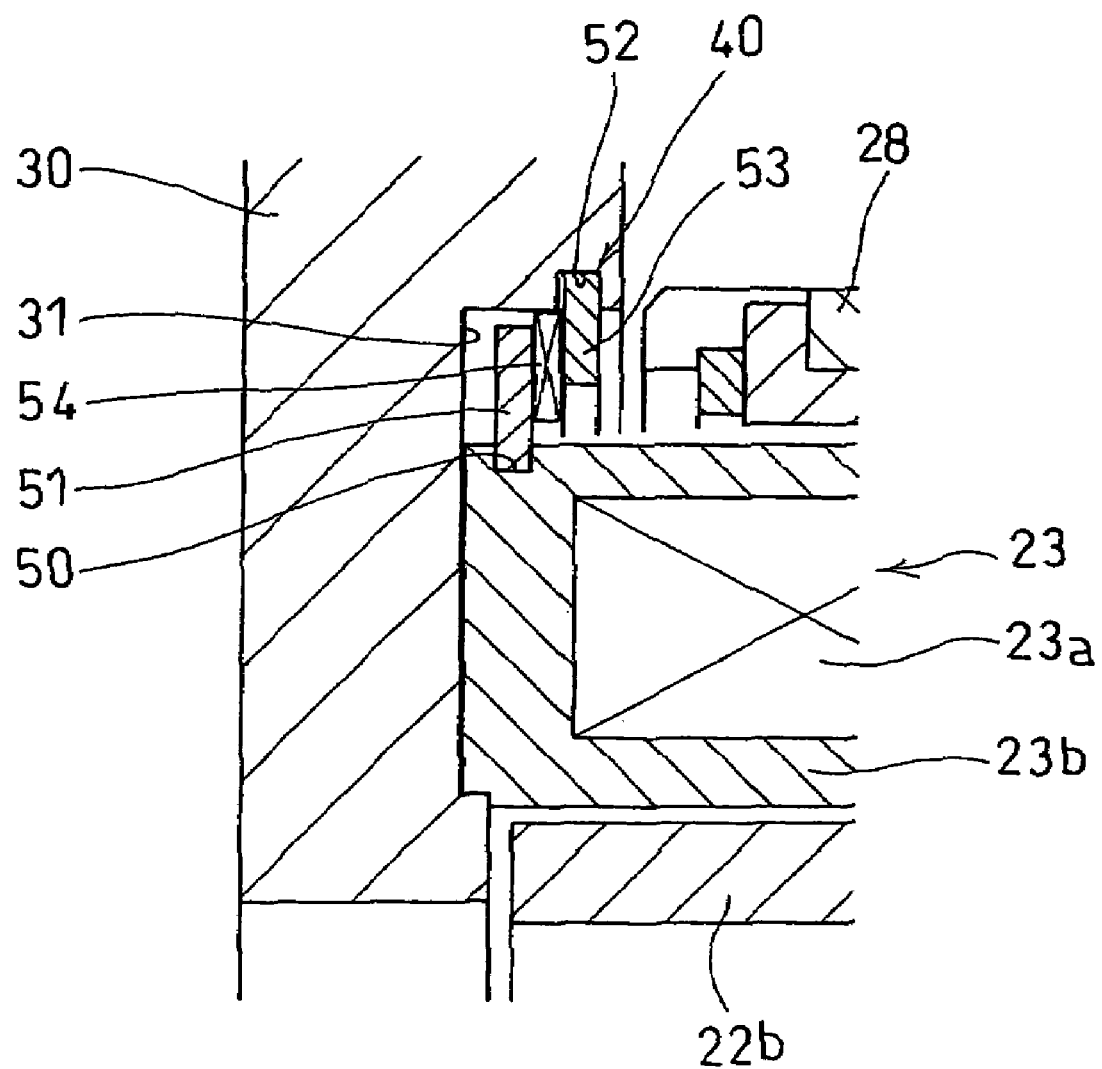
FIG. 6 is a sectional view of a still another positioning structure for the electromagnet.

FIG. 6 shows still another positioning structure 40 according to the present invention. The positioning structure 40 of FIG. 6 includes a first snap ring 51 engaged in a groove 50 formed in the outer periphery of the core 23b at its portion located inside the recess 31, and a second snap ring 53 engaged in a groove 52 formed in the inner periphery of the recess 31 at its portion axially offset from the groove 50 toward the opening of the recess 31. The positioning structure 40 further includes an elastic member 54 disposed between the first and second snap rings 51 and 53 to press the core 23b against the end wall of the recess 31. The elastic member 54 may be a disc spring or wave spring.

The elastic member 54 presses the core 23b against the end wall of the recess 31, thereby reliably preventing axial movement of the electromagnet 23 due e.g. to vibrations of the vehicle body, in the same manner as the positioning structure 40 of FIG. 4. The electromagnet 23 can thus be mounted in an extremely stable manner.

Since the first snap ring 51, through which the core 23b is pressed against the end wall of the recess 31 by the elastic member 54, is mounted on the core 23b simply by engaging it in the groove 50 formed in the outer periphery thereof, the first snap ring 51 can be far more easily mounted on the core 23b than the flange of the above-described prior art, which is fixed to the end of the core. The axial positioning structure of this embodiment is therefore less costly than the axial positioning structure of the prior art.

What is claimed is:

1. A rotation transmission device comprising an outer ring, an inner ring mounted inside said outer ring, said inner and outer rings being rotatable relative to each other, a two-way clutch comprising engaging elements disposed between radially opposed surfaces of said inner and outer rings, respectively, so as to be engageable with and disengageable from said radially opposed surfaces, and a retainer disposed between said radially opposed surfaces and retaining said engaging elements in position, an electromagnetic clutch provided in juxtaposition with said two-way clutch and comprising an armature rotationally fixed to said retainer so as to be axially movable relative to said retainer, a rotor rotationally fixed to said outer ring and axially facing said armature, and an electromagnet including a core and axially facing said rotor for magnetically attracting said armature until pressed against said rotor when energized, a stationary member formed with a recess having an end wall, and a positioning structure for axially positioning said electromagnet, said positioning structure comprising a flange fixed to said core of said electromagnet and received in said recess of said stationary member, a snap ring engaged in a groove formed in an inner periphery of said recess, said snap ring engaging said flange to prevent said flange from coming out of said recess, and an elastic member disposed between said end wall of said recess and said flange, thereby pressing said flange against said snap ring.

2. A rotation transmission device according to claim 1, wherein
said rotor is rotatable relative to said stationary member.

3. A rotation transmission device according to claim 2, wherein
said flange of said positioning structure comprises an annular disk.

4. A rotation transmission device according to claim 3, wherein
said annular disk has an inner periphery and an outer periphery; and
said snap ring is disposed in contact with said annular disk at said outer periphery thereof.

5. A rotation transmission device according to claim 4, wherein
said elastic member is disposed in contact with said annular disk at said inner periphery thereof.

6. A rotation transmission device according to claim 1, wherein
said flange of said positioning structure comprises an annular disk.

7. A rotation transmission device according to claim 6, wherein
said annular disk has an inner periphery and an outer periphery; and
said snap ring is disposed in contact with said annular disk at said outer periphery thereof.

8. A rotation transmission device according to claim 7, wherein
said elastic member is disposed in contact with said annular disk at said inner periphery thereof.

* * * * *